| DIGIT OUTPUT | 1 | 2 | 4 | 8 |
|---|---|---|---|---|
| 0 | | | | |
| 1 | X | | | |
| 2 | | X | | |
| 3 | X | X | | |
| 4 | | | X | |
| 5 | X | | X | |
| 6 | | X | X | |
| 7 | X | X | X | |
| 8 | | | | X |
| 9 | X | | | X |
| 10 | | X | | X |
| 11 | X | X | | X |
| 12 | | | X | X |
| 13 | X | | X | X |
| 14 | | X | X | X |
| 15 | X | X | X | X |
FIG 1
PRIOR ART
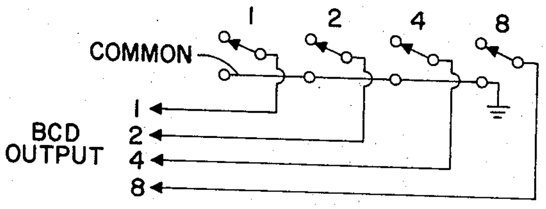
FIG 2
| DIGIT OUTPUT | 1 | 2 | 4 | 8 |
|---|---|---|---|---|
| *0 | | | X | X |
| 1 | X | | | |
| 2 | | X | | |
| 3 | X | X | | |
| 4 | | | X | |
| 5 | X | | X | |
| 6 | | X | X | |
| *7 | | X | | X |
| 8 | | | | X |
| 9 | X | | | X |
FIG 3
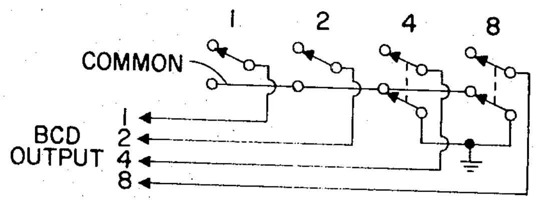
FIG 4
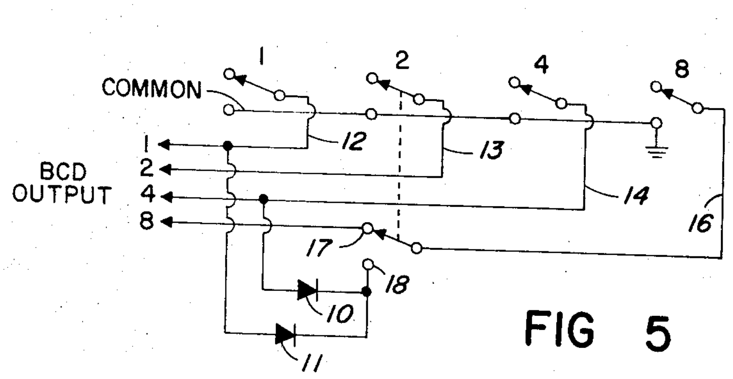
FIG 5
INVENTOR.
WINSTON F. WILLIAMS
BY Moody & Wallace
ATTORNEYS INVENTOR.
WINSTON F. WILLIAMS
BY Moody & Hallacher
ATTORNEYS

United States Patent Office 3,539,787

Patented Nov. 10, 1970

3,539,787

SYSTEM FOR CONVERTING FOUR-WIRE INFORMATION INTO BINARY CODED DECIMAL INFORMATION

Winston F. Williams, Cedar Rapids, Iowa, assignor to Collins Radio Company, Cedar Rapids, Iowa, a corporation of Iowa Filed Mar. 30, 1967, Ser. No. 627,221
Int. Cl. G06f 5/00
U.S. Cl. 235—154 3 Claims

ABSTRACT OF THE DISCLOSURE

Four-wire binary code decimal is a technique which is well-known in the art. In systems employing the technique, information available on four wires is representative of information which is provided on ten output leads according to a predetermined coding of the four-wire input. Such systems ordinarily employ a memory drum which contains a plurality of pins at each output position. Because the coding of the four-wire input sometimes requires either 0, 1, 2, or 3 pins, dependent upon the coding of the drum, each position must contain three pins and be capable of storing two pins. The disclosure shows how the size of the drum and the storage area of the drum can be significantly decreased by rewiring the output circuitry such that each output requires a maximum of two pins and a minimum of one pin. This advantage can be accomplished by extending the four-wire logic table beyond the normally used ten digits to the maximum available of fifteen digits and choosing only those digits requiring one or two pins.

This invention relates generally to digital circuitry and particularly to a class of digital circuitry referred to as binary coded decimal (BCD).

Many types of electronic equipment, such as flight controls for aircraft and various radio transmission systems, utilize a system of digital coding referred to as binary coded decimal. In such instances information supplied on four wires is representative of sixteen coded information bits. These information bits can be respectively identified as 0 through 15 and hereinafter will be referred to as digit outputs. The various digit outputs are derived from particular combinations of the four inputs available such that each combination of inputs is indicatve of one, and only one, of said output digits.

Systems employing this coding technique ordinarily include a drum which contains a plurality of pins. The pins are located such that the required combination of inputs is available for the decimal output. Therefore each pin is capable of closing a switch located near the drum pin so that the desired output is realized. Because the systems are used in aircraft and other equipments which have limited space and weight, it is desirable to decrease both these characteristics of the BCD conversion system. A decrease of size of the drum which contains the pins can best be realized if the number of pins included within the drum can be decreased. However, the BCD coding table requires four pins for at least one digit output and zero pins for at least one other digit output. Ideally it is preferable that each different output be capable of being accomplished by the use of a maximum of two pins and a minimum of one pin. The use of a maximum of two pins would decrease the drum because it would contain less pins. The use of a minimum of one pin would decrease the drum size because pins which are not in use for a particular coding of the drum must be stored at another place in the drum so that they are available when the coding of the drum is changed at another time.

Although the four-wire information fed into the system is capable of being coded into sixteen distinct digit outputs, a binary coded decimal system requires only ten distinct outputs and ordinarily are respectively identified as 0 through 9. The output digits 10 through 15, which can be derived from the system, are therefore not used in a decade system. Because the decade system requires only ten digit outputs none of the outputs requires four pins in the drum. However, one output requires three pins and another output requires zero pins. It is therefore desirable to modify the drum such that the output requiring three pins can be realized by the use of only two pins, and the output requiring no pins can also be realized by using one or two pins. As will be fully described hereinafter, the output digit 7 requires three pins, and the output digits 0 requires no pins. By changing these requirements the drum size can be substantially reduced.

It is therefore an object of this invention to provide a binary coded decimal system in which the size of the drum is held to a minimum.

It is also an object to provide such a system in which each of the ten digit outputs can be realized by use of a maximum of two pins and a minimum of one pin.

It is another object of the invention to povide such a system in which the output circuitry associated with the memory drum is modified such that the digits 7 and 0 are modified to require only two pins in the memory drum.

Further objects, features, and advantages of the invention will become apparent from the following description and claims when read in view of the accompanying drawings, wherein like numbers indicates like parts and in which:

FIG. 1 shows the logic table for the binary coded decimal system utilized in this invention;

FIG. 2 shows in schematic form the output circuitry associated with the memory drums of the prior art systems;

FIG. 3 shows the logic table pertinent to the invention system and the digits 0 and 7 are modification of the digits as shown in the table of FIG. 1;

FIG. 4 shows the modifications required for the circuit shown in FIG. 2 in order to realize the 0 output from the pin positions of the table shown in FIG. 3;

FIG. 5 shows the modifications required of FIG. 2 in order to realize the digit 7 output from the pin positions of the table shown in FIG. 3;

Figures 9, 10, 11:
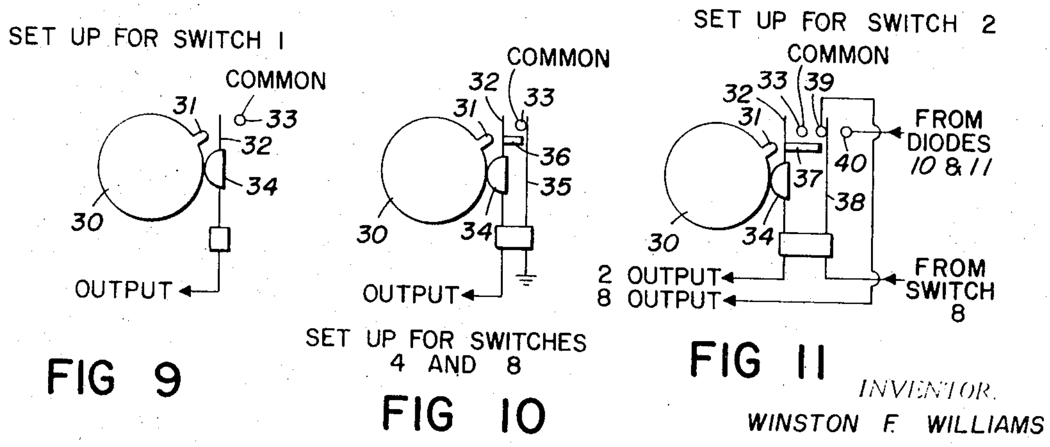
FIG. 9 shows the mechanical switching associated with the switch 1 and the memory drum.

FIG. 10 shows the mechanical switching associated with switches 4 and 8 and the memory drum; and FIG. 11 shows the mechanical switching associated with switch 2 and the memory drum.

The accomplishments of this invention can best be understood by viewing the logic table shown in FIG. 1. In a binary coded decimal system only the first ten digits, 0 through 9, are required. Each X in the FIG. 1 table represents a ground and therefore requires a pin in the position under which the X appears. It should be noted that in this system the X's indicate a ground for convenience only and it is also possible to indicate the opening of a switch to remove a ground by an X. In order to realize the digit output desired it is necessary to ground the switches having an X as shown in the table. For example, in order to achieved a digit 5, output switches 1 and 4 of the FIG. 2 circuit must be closed. Consequently the memory drum will have a pin at positions 1 and 4 such that the pins contact the leaves of switches 1 and 4 to bias them to common ground line.

In viewing the digits 0 through 9 of FIG. 1 it should be noted that all digits except 0 and 7 require either one or two pins. The digit 0 requires no pins and the digit 7 requires three pins. Because the pins not in use must be stored it is necessary that two pins be stored for the digit 0. Also because digit 7 requires three pins it is necessary to insert an extra pin at each such position in the memory drum. If it were possible to achieve the digits 0 and 7 with either one or two pins the storage area could be decreased by 50% and the pin area for the digit 7 decreased by one-third. This can be accomplished by substituting the switching logic of digit 10, which requires only two pins, for the digit 7 and the digit 12 which also requires only two pins for the digit 0. The table modified in this manner is shown in FIG. 3.

Referring now to FIG. 2, it is noted that the digit output desired is achieved by closing the appropriate switches as dictated by the logic table. The logic table shown in FIG. 3 therefore does not conform with the circuitry shown in FIG. 2. For example, the FIG. 3 logic table requires the closing of switches 4 and 8 to obtain a zero. This cannot be done with the circuit of FIG. 2 because it conforms with the table shown in FIG. 1 and consequently the closing of switches 4 and 8 gives an output digit 12. It is therefore necessary to modify the FIG. 2 circuit in a manner such that the simultaneous closing of switches 4 and 8 results in none of switches 1, 2, 4, and 8 having a ground connection. The required modifications for this are shown in FIG. 4.

In FIG. 4 the 1 and 2 switches are identical to those shown in FIG. 2. The 4 and 8 switches have been modified by adding a second leaf to each of the two switches. The two leaves of each switch are mechanically connected so that they are simultaneously actuated. The fixed end of the lower leaf on each of the two switches is connected to ground. The modified logic table of FIG. 3 dictates that a pin be present in the drum at switches 4 and 8. However, the actual logic table of FIG. 1 requires that a 0 is realized when none of the switches is grounded. The modified circuit of FIG. 4 accomplishes this because the pins that are present in the drum at positions 4 and 8 will bias the bottom leaf of each of the two switches off the common wire and therefore none of the four switches is grounded. The circuit of FIG. 4 therefore is consistent with the logic table of FIG. 1. It should be noted that all the other digit outputs of FIG. 1, except digit 7, can be realized by the circuit of FIG. 4. The method of obtaining the digit 7 is shown in FIG. 5.

FIG. 5 shows the modifications required of the FIG. 2 circuit in order to achieve the digit 7 by grounding pins 2 and 8 as shown in the modified table of FIG. 3. In this circuit switch 2 has been modified to include a second leaf. The two leaves of the switch 2 are mechanically coupled so that both open and close simultaneously. The circuit has also been modified by adding a pair of diodes 10 and 11. The output of switch 1 is taken off the fixed end of the leaf directly by a single wire 12. The output of switch 2 is taken directly off the fixed end of the leaf by a wire 13. The output of switch 4 is taken off the fixed end of the leaf by a wire 14. The output of switch 8 is taken off the fixed end of the leaf by a wire 16 which is connected to the fixed end of the bottom leaf of switch 2. The terminal 17 of switch 2 is connected to the 8 output. The terminal 18 is connected to the back of parallel connected diodes 10 and 11. The other side of diode 10 is connected to output line 4 and the other side of diode 11 is connected to the output line 1. The logic table of FIG. 1 indicates that switches 1, 2, and 4 must be grounded in order to achieve a digit 7 output. However, the modified table of FIG. 3 shows that pins will be present only at switches 2 and 8. In viewing FIG. 5 it is noted that when switches 2 and 8 are closed, switches 1, 2, and 4 are grounded and therefore the output is a digit 7. Switch 1 is grounded via line 12 through diode 11, terminal 18, line 16 and switch 8 to the common ground. Switch 2 is grounded directly to the Common. Switch 4 is grounded via line 14, diode 10, terminal 18, line 16, and switch 8. Switch 8 is likewise grounded directly to the Common but no output is realized on output line 8 because switch 8 is connected to the back side of diodes 10 and 11. The circuit as modified therefore yields a digit 7 output when pins are present at the 2 and 8 positions of the drum. All the requirements of Table 1 can be fulfilled by the circuit of FIG. 5 with the exception of the digit 0. It is therefore necessary to combine the modifications of FIGS. 4 and 5 in order to accomplish all 10 digit outputs 0 through 9 of FIG. 1.

Figure 6:
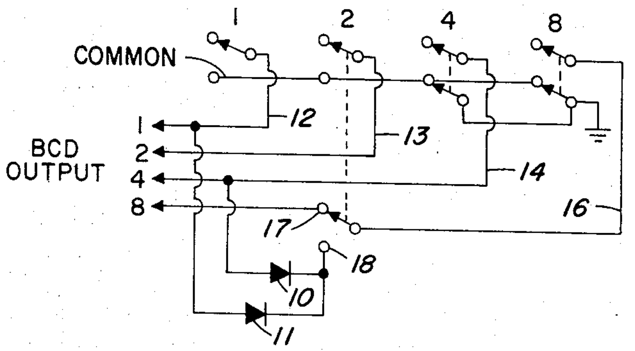
FIG. 6 shows the combined modifications of FIGS. 4 and 5 such that the entire logic table shown in FIG. 3 can be realized.

The combination of the circuits of FIGS. 4 and 5 is shown in FIG. 6. In this figure an extra leaf has been added to each of switches 4 and 8 in the same manner as shown in FIG. 4. Also an extra leaf has been added to switch 2 and the parallel diodes 10 and 11 have also been added to the circuit. The circuit of FIG. 6, by using the pin positions indicated in the modified table of FIG. 3, is capable of yielding all of the digits 0 through 9 as shown in FIG. 1. Therefore the drum can be modified such that its size can be decreased in the storage area required for the digit 0 and the number of pins required for the digit 7 simply by modifying the switch positions 2, 4, and 8 in a manner consistent with that shown in FIG. 6.

The operation of the modified circuit is easily seen to obey the logic of the FIG. 1 table by using the pin positions of the FIG. 3 table.

Digit 0 requires no grounds, uses pins 4 and 8. The bottom leaves of switches 4 and 8 are pressed away from the Common and therefore no switches are grounded.

Digit 1 requires a ground on 1, uses a pin on switch 1. A direct connection to Common and grounded through switch 8.

Digit 2 requires a ground on 2, uses a pin on switch 2. A direct connection to Common and grounded through switch 4 and 8.

Digit 3 requires a ground on 1 and 2, uses pins on switch 1 and 2. Both connected to Common and grounded through switch 4 and 8.

Digit 4 requires a ground on 4, uses a pin on switch 4. A direct connection to Common and grounded through switch 8.

Digit 5 requires a ground on 4 and 1, uses a pin on switches 4 and 1. Both connected to Common and grounded through switch 8.

Digit 6 requires a ground on 4 and 2, uses a pin on switches 4 and 2. Both connected to Common and grounded through switch 8.

Digit 7 requires a ground on 1, 2, and 4, uses a pin on switches 2 and 8. 1 and 4 are grounded through diodes 10 and 11, line 16 and switch 8, switch 2 is grounded directly to Common. No output from switch 8 because of diodes 10 and 11 and the removal of the leaf from terminal 17.

Digit 8 requires a ground on 8, uses a pin on switch 8. Connected to Common which is grounded through switch 4.

Digit 9 requires a ground on 8 and 1, uses a pin on 8 and 1. Both connected to Common which is grounded through switch 4.

Figure 7:
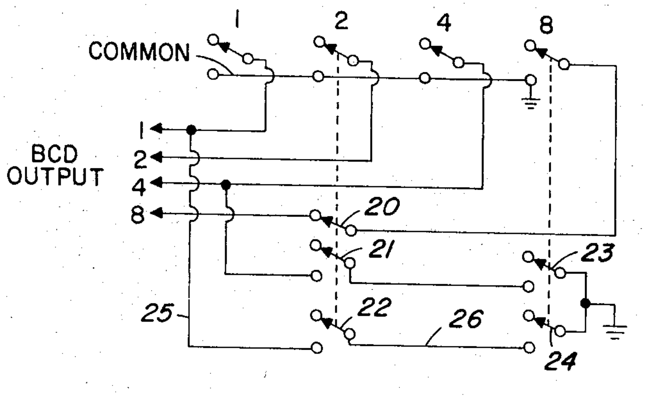
FIG. 7 shows another method of accomplishing the modified digit 7 shown in FIG. 3.
Figure 8:
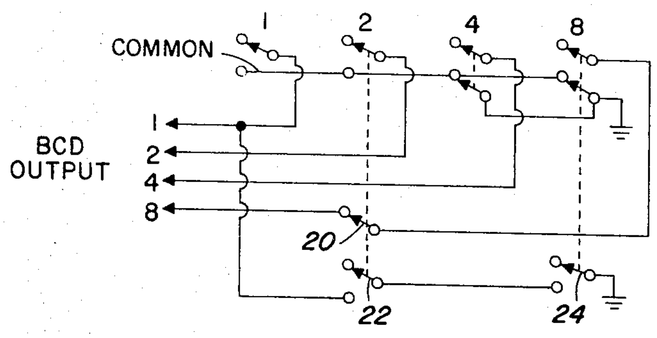
FIG. 8 is another embodiment of the circuit shown in FIG. 6 and is capable of producing the entire logic table shown in FIG. 1 by using the pin positions of the table shown in FIG. 3.

FIG. 7 shows a modification of the switching arrangement such that the digit 7 can be realized by utilizing pins 2 and 8 and therefore is the electrical equivalent of the circuit shown in FIG. 5. However, the circuit of FIG. 7 does not require the use of any diodes. In the FIG. 7 embodiment switch 2 has been modified by adding three leaves 20, 21, and 22 such that all four leaves are mechanically tied together. Switch 8 has been modified by adding two leaves 23 and 24 which are mechanically tied to the main leaf. Upon closing switches 2 and 8 the digit 7 output is realized by an output on each of wires 1, 2, and 4. The fixed side of switch 1 is grounded through line 25, leaf 22, line 26 and leaf 24. Switches 2 and 4 are grounded directly to the Common. Switch 8 is grounded directly to the Common but no output is present on the BCD output lines because leaf 20 has been removed from output line 8. The circuit shown in FIG. 7 therefore is capable of producing all the digits 1 through 9 but cannot produce the 0 output. In order to produce the 0 output the circuit is further modified as shown in FIG. 8. This figure is very similar to that shown in FIG. 7. However, leaf 21 and leaf 23 have been eliminated. The FIG. 8 circuit is capable of producing all the digits 0 through 9 of FIG. 1 by using the pin positions as shown in FIG. 3. The FIG. 8 circuit is therefore the electrical equivalent of that shown in FIG. 6. However, no diodes are required in this embodiment.

FIG. 9 shows the mechanical arrangement required for the switch position of the circuit shown in FIG. 6. A memory drum 30 containing pins 31 will close a switch consisting of a leaf 32 and the Common 33. The Common 33 is the Common shown in FIGS. 1 through 8. Upon rotation of the drum a pin 31 contacts an insulated land area 34 to cause the leaf 32 to be biased against the Common 33.

FIG. 10 shows the modification required at switch positions 4 and 8. In this figure an extra leaf 35 has been added to the circuitry. This corresponds to the upper leaf of switches 4 and 8 as shown in FIG. 6. Rotation of drum 30 causes pin 31 to contact land area 34 to bias leaf 32 against the common wire 33. The movement of leaf 32 causes the insulated element 36 to bias leaf 35 away from its normal contact with Common 33.

FIG. 11 shows the modifications required at switch position 2. In this embodiment an extra leaf 38 and two terminals 39 and 40 have been added to the basic switch of FIG. 9. Movement of leaf 32, due to the action of pin 31, causes leaf 32 to contact Common 33 while the insulated element 37 biases leaf 38 from its normal contact with terminal 39 into contact with terminal 40. It should be noted that although leaf type switches are shown in the embodiments illustrated herein the particular type of switch used is not critical to the invention and any of the switches well-known in the art can be used.

Although this invention has been described with respect to particular embodiments thereof, it is not to be so limited, as changes and modifications may be made therein which are within the spirit and scope of the invention as defined by the appended claims.

I claim:

1. In a system for converting information contained on a four-wire electrical system into distinct digital outputs; a digital information readout device including drum means, and at least one pin and switch means for effecting electrical switching for each of said digital outputs and a maximum of two pin and switch means for effecting electrical switching for each of said digital outputs, said pin means being on said drum means and said switch means being located in the proximity of said drum means so that said pin means can actuate said switch means by contact therewith, said system obeying the following logic table:

| Digital outputs | Four-wire information | | | |
|---|---|---|---|---|
| | 1 | 2 | 4 | 8 |
| 0 | | | | |
| 1 | X | | | |
| 2 | | X | | |
| 3 | X | X | | |
| 4 | | | X | |
| 5 | X | | X | |
| 6 | | X | X | |
| 7 | X | X | X | |
| 8 | | | | X |
| 9 | X | | | X |

where X indicates a wire output.

2. The system of claim 1 wherein said pin means are located on said drum means to actuate one of four switch means, designated 1, 2, 4, and 8 respectively, in accordance with the following table:

| Switch means | | | |
|---|---|---|---|
| 1 | 2 | 4 | 8 |
| | | Y | Y |
| Y | | | |
| | Y | | |
| Y | Y | | |
| | | Y | |
| Y | | Y | |
| | Y | Y | |
| | Y | | Y |
| | | | Y |
| Y | | | Y |

where Y indicates an actuated switch.

3. The system of claim 1 wherein said four-wire information is capable of representing sixteen digital outputs according to a predetermined coding of said information readout means and wherein a selected ten of said sixteen digital outputs are utilized.

References Cited

UNITED STATES PATENTS 3,089,131 5/1963 Morgan ------------ 340—347

3,067,414 12/1962 Kelly -------------- 340—347

OTHER REFERENCES

IBM Tech. Dis., vol. 3, No. 3, August 1960, "Code Translator," D. F. Busch.

MAYNARD R. WILBUR, Primary Examiner

J. GLASSMAN, Assistant Examiner

U.S. Cl. X.R.

340—347